(12) United States Patent
He et al.

(10) Patent No.: US 10,180,377 B2
(45) Date of Patent: Jan. 15, 2019

(54) ELECTRIC WHEEL TEST BED

(71) Applicant: Shenzhen Polytechnic, Shenzhen, Guangdong Province (CN)

(72) Inventors: Ping He, Shenzhen (CN); Chengwei Han, Shenzhen (CN); Zhurong Dong, Shenzhen (CN); Songhua Hu, Shenzhen (CN)

(73) Assignee: SHENZHEN POLYTECHNIC, Shenzhen, Guangdong (CN)

( * ) Notice: Subject to any disclaimer, the term of this patent is extended or adjusted under 35 U.S.C. 154(b) by 129 days.

(21) Appl. No.: 15/308,089

(22) PCT Filed: Nov. 11, 2014

(86) PCT No.: PCT/CN2014/090822
§ 371 (c)(1),
(2) Date: Oct. 31, 2016

(87) PCT Pub. No.: WO2015/188584
PCT Pub. Date: Dec. 17, 2015

(65) Prior Publication Data
US 2017/0059451 A1  Mar. 2, 2017

(30) Foreign Application Priority Data

Jun. 11, 2014  (CN) .......................... 2014 1 0257936

(51) Int. Cl.
*G01M 17/007* (2006.01)
*G01M 17/013* (2006.01)
*G01M 17/06* (2006.01)

(52) U.S. Cl.
CPC ........ *G01M 17/013* (2013.01); *G01M 17/007* (2013.01); *G01M 17/065* (2013.01)

(58) Field of Classification Search
USPC .............. 73/116.01, 116.05, 116.06, 118.01, 73/118.02
See application file for complete search history.

(56) References Cited

U.S. PATENT DOCUMENTS 4,078,339 A * 3/1978 Ongaro ................... B24B 5/366
451/1
4,238,954 A * 12/1980 Langer ................ G01M 17/022
73/146
(Continued)

FOREIGN PATENT DOCUMENTS

CN  201133871 Y  10/2008
CN  101639407 A  2/2010
(Continued)

OTHER PUBLICATIONS

Zunyou Chen, "Structure Design and Topology Optimization of a Novel In-Wheel Motor and Design of Test Bench", Dissertation in South China University of Technology, Dec. 2012, Guangzhou, China.

*Primary Examiner* — Eric S McCall
(74) *Attorney, Agent, or Firm* — Cheng-Ju Chiang

(57) ABSTRACT

A test bed for electric wheel comprehensive performance is characterized in that the test bed comprises a foundation, a portal frame set on the foundation and including a cross beam and two columns supporting both ends of the cross beam individually, a main pin arm movably connected to the portal frame, and a main rotation shaft revolvably and perpendicularly mounted on the top of the main pin arm, wherein the electric wheel is mounted on the main pin arm and is located inside of the portal frame and right below the main rotation shaft. The test bed further comprises at least one of a road simulation mechanism, an inertia simulation mechanism, a driving power mechanism, a perpendicular
(Continued)

loading mechanism, and a steering mechanism which take the simulation test on the electric wheel.

12 Claims, 6 Drawing Sheets

(56) References Cited

U.S. PATENT DOCUMENTS

| | | | | |
|---|---|---|---|---|
| 4,344,324 A | * | 8/1982 | Langer | G01M 17/022 198/837 |
| 4,455,866 A | * | 6/1984 | Barrigar | G01M 17/0074 73/116.07 |
| 4,936,138 A | * | 6/1990 | Cushman | G01M 17/025 73/146 |
| 4,949,574 A | * | 8/1990 | Linden | G01M 17/022 73/146 |
| 5,103,595 A | * | 4/1992 | Dale | G01M 1/30 451/11 |
| 5,241,856 A | * | 9/1993 | Petersen | G01M 13/027 73/115.07 |
| 5,323,646 A | * | 6/1994 | Poling, Sr. | G01M 17/022 73/146 |
| 6,247,348 B1 | * | 6/2001 | Yamakado | G01M 17/045 73/11.04 |
| 6,457,351 B1 | | 10/2002 | Yamamoto | |
| 2003/0029235 A1 | * | 2/2003 | Yurjevich | G01M 17/02 73/146 |
| 2003/0188574 A1 | * | 10/2003 | Weiss | G01M 17/02 73/146 |
| 2007/0261469 A1 | | 11/2007 | Friske et al. | |
| 2009/0000371 A1 | * | 1/2009 | Hanada | G01M 17/022 73/146 |
| 2014/0230534 A1 | * | 8/2014 | Tachibana | G01M 17/021 73/146 |
| 2015/0040679 A1 | * | 2/2015 | Edelson | G01M 17/0074 73/802 |
| 2015/0292984 A1 | * | 10/2015 | Caslaru | G01M 17/022 73/146 |

FOREIGN PATENT DOCUMENTS

| | | |
|---|---|---|
| CN | 202563071 U | 11/2012 |
| CN | 102944428 A | 2/2013 |
| CN | 203011699 U | 6/2013 |
| CN | 103439117 A | 12/2013 |
| CN | 103592135 A | 2/2014 |
| CN | 104075893 A | 10/2014 |
| CN | 203941012 U | 11/2014 |
| CN | 203941013 U | 11/2014 |
| CN | 204027835 U | 12/2014 |

* cited by examiner

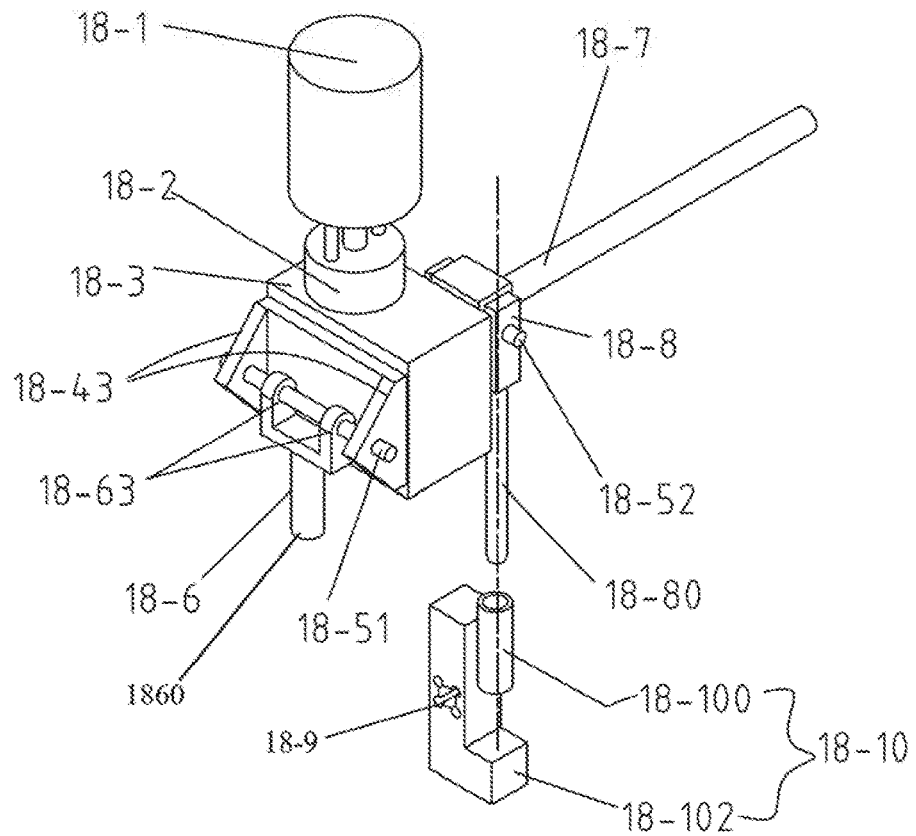
FIG. 4
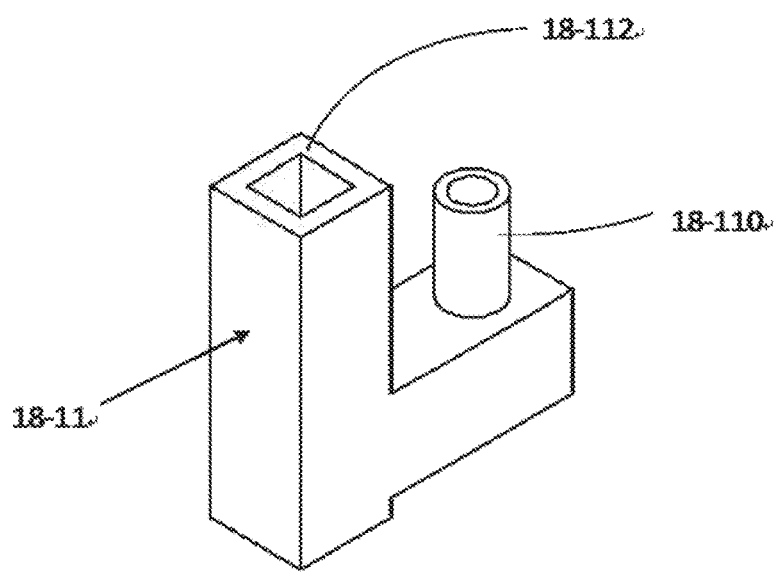

ELECTRIC WHEEL TEST BED

CROSS REFERENCE TO RELATED APPLICATIONS

The present application is a 35 U.S.C. § 371 National Phase conversion of International (PCT) Patent Application No. PCT/CN2014/090822, filed on Nov. 11, 2014, the disclosure of which is incorporated by reference herein. The PCT International Patent Application was filed and published in Chinese.

TECHNICAL FIELD

The present invention relates to vehicle engineering technology, and especially to a test bed for electric wheel comprehensive performance.

DESCRIPTION OF BACKGROUND

Traditionally, there are three methods to study and test electric vehicles: real vehicle road simulation, laboratory bench test, and computer simulation test.

However, real vehicle road simulation needs a long-term research, high test cost but has low reproducibility; computer simulation test is simple but reliability thereof is not high; bench test has advantages of a shorter cycle, lower test cost, higher reproducibility, and Hardware-In Loop simulation is applicable, and bench test will not be affected by unexpected conditions. Thus it is very necessary to build a beach test device for electric vehicles.

SUMMARY

An object of the present invention is to provide a test bed for the electric wheel comprehensive performance, which can be used for road simulation, inertia simulation, driving simulation and braking simulation, and thus to obtain a comprehensive research to an electric vehicle and particular to the electric wheel of the electric vehicle in various driving conditions, and finally to serve for a whole vehicle research.

To achieve the above object, a test bed for electric wheel comprehensive performance provided in the present invention comprises: a base; a portal frame, set on the base, comprising a cross beam and two columns each supported at either ends of the cross beam; a main pin arm, actively connected to the portal frame; and a main rotation shaft, rotatably and vertically mounted on a top of the main pin arm. Wherein an electric wheel is mounted to the main pin arm inside the portal frame and just below the main rotation shaft; the test bed further comprises at least one of mechanisms selected from a road simulation mechanism, an inertia simulation mechanism, a driving power mechanism, a perpendicular loading mechanism, and a steering mechanism, all of which are used for performing simulation test to the electric wheel.

The road simulation mechanism comprises: a drum, a torque and rotational-speed sensor, and several bearings and shaft couplings; the drum is just located below the electric wheel, both the drum and the electric wheel have their circumferential surfaces with a tangent contact each other; the electric wheel always keeps tangent contact with the drum; the drum and the torque and rotational-speed sensor are connected via the bearings and the shaft couplings for driving-force transmission; the road simulation mechanism is mounted on the base via the bearings.

The inertia simulation mechanism comprises a flywheel and a clutch coaxially connected with each other; the inertia simulation mechanism and the road simulation mechanism are connected via driving-force transmission.

The driving power mechanism is selectably in a motor mode or in a power generation mode, comprises an electric dynamometer: in the motor mode for braking simulation, further comprises a power source for supplying power to the electric dynamometer; in the power generation mode of the driving power mechanism, further comprises an energy dissipation device for consuming energy generated by the electric dynamometer; the electric dynamometer are connected with both the inertia simulation mechanism and the road simulation mechanism via driving-force transmission.

The road simulation mechanism and the inertia simulation mechanism are connected via belt pulleys for driving-force transmission; the driving power mechanism is connected with the inertia simulation mechanism with bearings and shaft couplings coaxially and rotatably connected therebetween; and the bearings connecting the driving power mechanism and the inertia simulation mechanism are mounted on the base.

The steering mechanism is mounted to both the portal frame and the main pin arm in a way rotating horizontally or vertically relative to the portal frame; the steering mechanism comprises a motor, a worm case, a ball screw, a steering-force sensor, a first connection member and a second connection member; a rotary shaft of the motor is rotatably engaged with the worm case and drives a worm in the worm case to rotate; the ball screw and the worm case are engaged with each other to transfer rotation to linear motion; the first connection member connects the worm case to the portal frame in a way of universal activity; the second connection member connects both the worm case and the ball screw to the main pin arm in a way of universal activity and drives the main pin arm to rotate around the main rotation shaft to steer the electric wheel; the steering-force sensor is used to detect a steering force of the main pin arm.

The first connection member at one side thereof comprises a connecting rod with a fixed sleeve at one end thereof, a fixed bearing seat, a vertical connecting shaft and a first pin; the fixed bearing seat and the ball screw are respectively set at a left and right side of the worm case; a top end of the vertical connecting shaft is rotatably fitted around the first pin; the first pin is rotatably mounted to the fixed bearing seat; a lower end of the vertical connecting shaft is supported via the fixed sleeve of the connecting rod with an engagement of horizontal rotation therebetween; the other end of the connecting rod is soldered to the portal frame; the steering mechanism is able to rotate horizontally via a rotatable engagement between the lower end of the vertical connecting shaft and the fixed sleeve, and is able to rotate vertically via rotatable engagements between the first pin and both the fixed bearing seat and the top end of the vertical connecting shaft.

The top end of the vertical connecting shaft is fitted around the first pin via a pair of shaft sleeves set on the vertical connecting shaft and vertically rotates; the first pin is rotatably inserted into a pair of spaced shaft sleeves set on the fixed bearing seat, and further mounts the connecting shaft between the pair of spaced shaft sleeves.

The lower end of the vertical connecting shaft is straight-rod like and is rotatably fitted in the fixed sleeve at one end of the connecting rod; the connecting rod is shaped as an "L" with one end thereof set with the fixed sleeve for a rotatable engagement with the lower end of the vertical connecting shaft and with the other end is fixed to the portal frame.

The vertical connecting shaft is in a shape of a fork.

The second connection member comprises a rolling bearing, a second pin and a connection seat; the rolling bearing is hinged with a movable end of the ball screw via the second pin; a steering-force sensor is mounted in the connection seat; the connection seat at one end thereof is set with a fixed sleeve, and the other end of the connection seat is fixed to the main pin arm; the rolling bearing is set with a vertical shaft extending downwards and is rotatably inserted in the fixed sleeve of the connection seat whereby the steering force is transferred to both the steering-force sensor and the main pin arm.

The rolling bearing is shaped as a fork.

The ball screw is horizontally set above the main pin arm; the rolling bearing is mounted to the movable end of the ball screw at a left side thereof, and the second pin is rotatably fitted through the rolling bearing and is perpendicular to the ball screw.

A rotary shaft of the main pin arm for mounting the electric wheel is set with a lateral-force sensor for detecting a value of a lateral force.

The perpendicular loading mechanism is connected to the main pin arm via the main rotation shaft, and transfers a vertical load through the main rotation shaft and the main pin arm to the electric wheel, the electric wheel moves up and down following the main pin arm, which is able to simulate the electric wheel jumping up and down under actual driving conditions.

The perpendicular loading mechanism comprises the motor, the worm case with the ball screw, a bidirectional-pressure connector, a pull-pressure sensor and a shorter gear; a support is set above the cross beam of the portal frame, the worm case of the perpendicular loading mechanism is fixedly set to the support, the motor of the perpendicular loading mechanism is set to the support and is connected with the worm case of the perpendicular loading mechanism, the movable end of the ball screw of the perpendicular loading mechanism is fitted in one end of the bidirectional-pressure connector, the other end of the bidirectional-pressure connector is connected with the pull-pressure sensor, the pull-pressure sensor is connected with the shorter gear, a rotary shaft of the shorter gear is connected to the main rotation shaft, and the main rotation shaft is connected to the main pin arm via the bearing.

Advantages

The test bed in accordance with the embodiments of the present invention has such advantages that:
(1) road simulation, resistance simulation, vehicle-weight simulation, and inertia simulation can be performed;
(2) braking simulation including mechanical braking simulation, electric regenerative braking simulation, or mechanical-braking combining electric regenerative braking simulation can be performed;
(3) a lateral force applied to the electric wheel can be simulated using the steering mechanism during the electric wheel is steered as actual driving conditions;
(4) a vertical load applied to the electric wheel such as weight and the load can be simulated using the perpendicular loading mechanism as actual driving condition;
(5) according to above (1), (2), (3) and (4), bidirectional loading simulation test, inertia simulation, and braking simulation to the electric wheel can all be performed at the same time using the test bed while not just applicable to single one of (1), (2), (3) or (4); it is closer to an actual driving condition, and it is benefit to improve the accuracy of the test results.

DESCRIPTION OF THE DRAWINGS

FIG. 4 is a partly-exploded view of a steering mechanism in accordance with the embodiment of the present invention;

FIG. 5 is a perspective view of a connecting rod in accordance with the embodiment of the present invention;

DETAILED DESCRIPTION OF THE EMBODIMENTS

The physical embodiments adopted in the present invention will be presented by the following depicted embodiments and accompanying drawings for further explanations.

Figure 1:
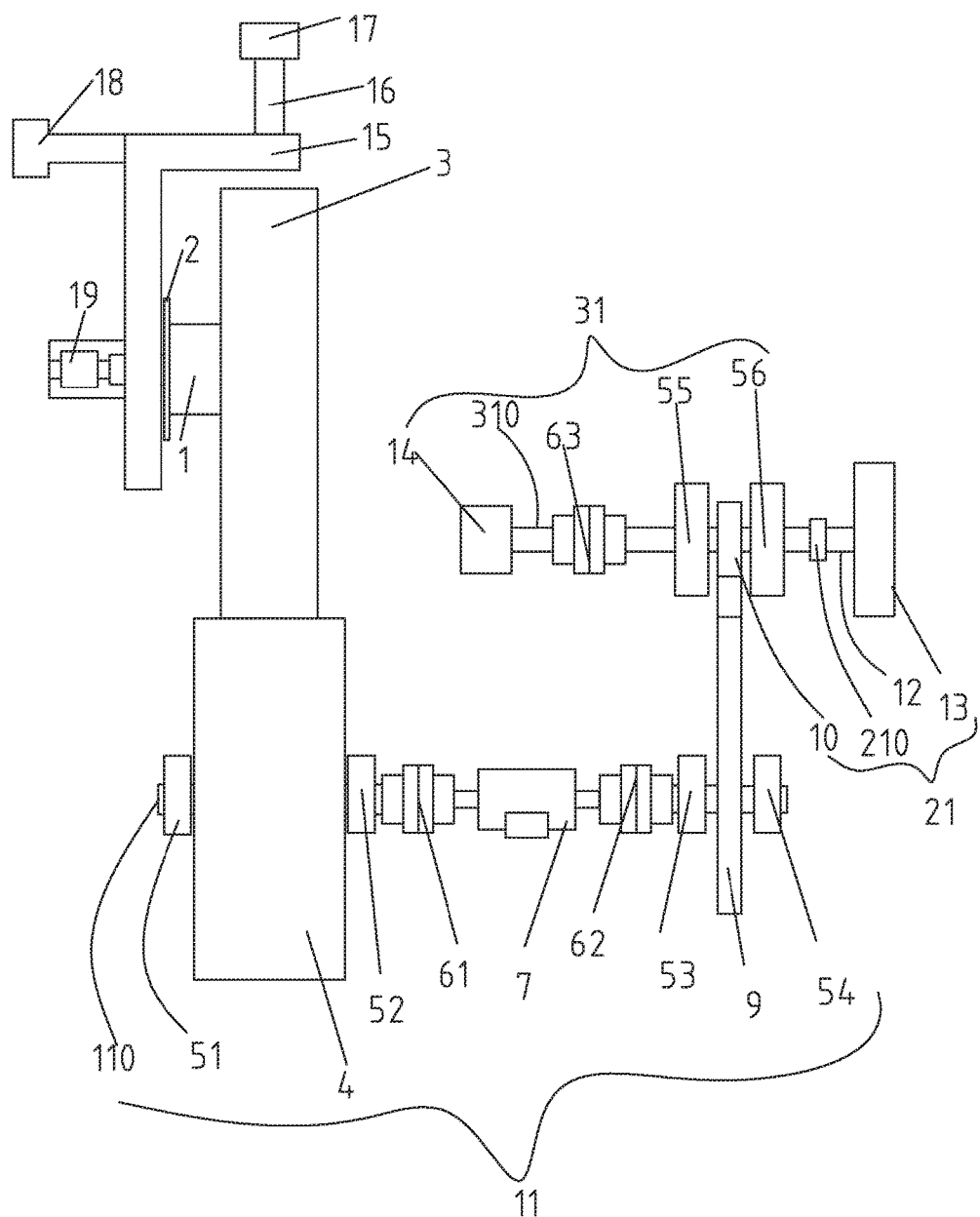
FIG. 1 is a plan view of a test bed for electric wheel comprehensive performance in accordance with an embodiment of the present invention.
Figure 2:
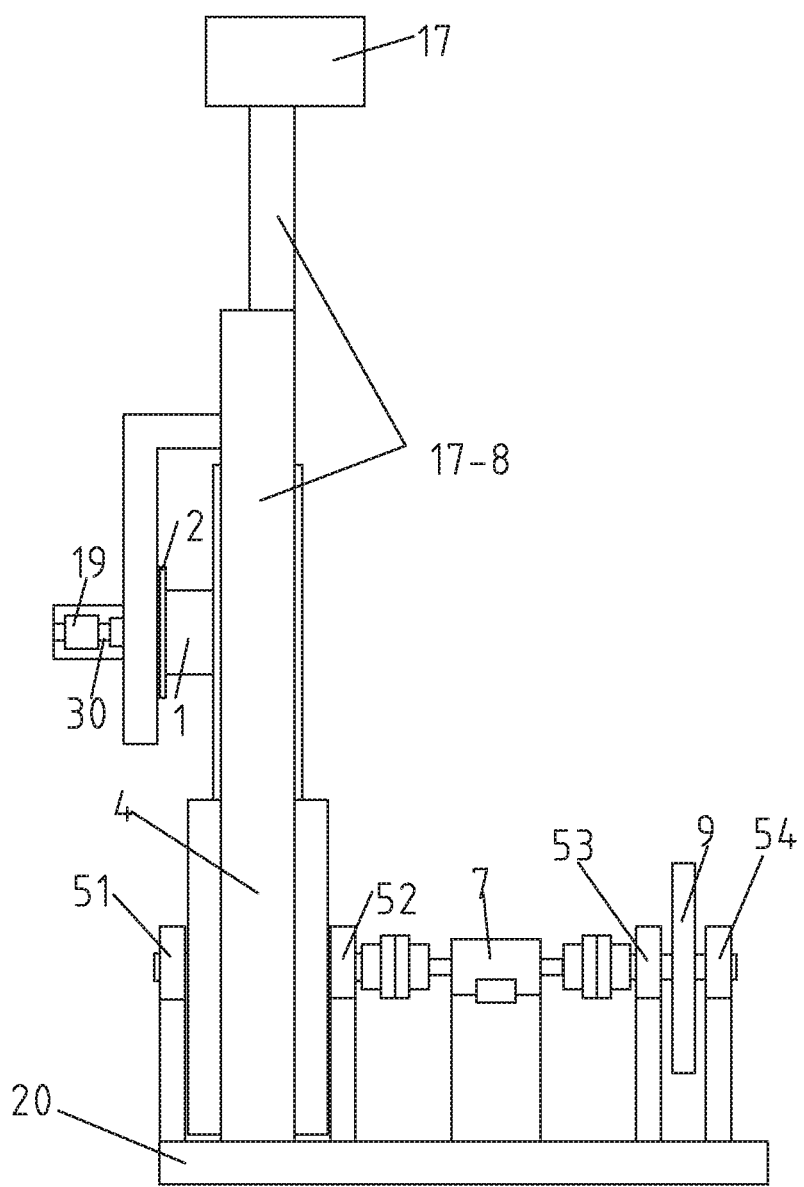
FIG. 2 is an installation plan view of the test bed for electric wheel comprehensive performance in accordance with the embodiment of the present invention.

A test bed for electric wheel comprehensive performance of the present invention is mainly used for an electric wheel test to pure electric vehicle. Referring to FIGS. 1-2, the test bed comprises a base 20 and a portal frame 17-8 disposed on the base 20, and one or more mechanisms selected from a road simulation mechanism 11, an inertia simulation 21, a driving power mechanism 31, a perpendicular loading mechanism 17 and a steering mechanism 18.

The test bed described follows as an illustrative example, comprises the base 20, the portal frame 17-8 disposed on the base 20, the road simulation mechanism 11, the inertia simulation mechanism 21, the driving power mechanism 31, the perpendicular loading mechanism 17, and the steering mechanism 18.

The road simulation mechanism 11 comprises a rotating drum 4, a torque and rotational-speed sensor 7 for collecting a torque and a rotational speed of the rotating drum 4, and a first belt pulley 9; the rotating drum 4 and the first belt pulley 9 are respectively connected either side of the torque and rotational-speed sensor 7 by rotating shafts, and the three are coaxially mounted to a first center shaft 110. The rotating drum 4 is located just below a wheel 3 and aligned to the wheel 3, and both the rotating drum 4 and the wheel 3 have their circumferential surfaces with a tangent contact each other. The inertia simulation mechanism 21 comprises a flywheel 13, a clutch 12, and a second belt pulley 10; and those three are mounted to a second center shaft 210. The driving power mechanism 31 mainly comprises an electric dynamometer 14, which is selectably in a power generation mode for a resistance simulation, or in a motor mode for a braking simulation; in particular, the driving power mechanism 31 in the motor mode comprises the electric dynamometer 14 and further a power source (not shown) for supplying power to the electric dynamometer 14; the driving power mechanism 31 in the power generation mode comprises the electric dynamometer 14 and further an energy dissipation device (not shown) for consuming the generated energy from the electric dynamometer 14 in the power generation mode, certainly, an energy storage device such as a storage battery can be used to replace the energy dissipation device and thus to improve resource utilization. The flywheel 13 and the electric dynamometer 14 are respectively connected at either side of the second belt pulley 10 by a rotary shaft, and the clutch 12 is located between the second belt pulley 10 and the flywheel 13; the first belt pulley 9 and the second belt pulley 10 are connected via a belt and thus the rotating drum and the driving power mechanism 31 get connected for driving power transmission.

Specifically, the road simulation mechanism 11 further comprises a first bearing 51, a second bearing 52, a third bearing 53, a fourth bearing 54, a first shaft coupling 61, and a second shaft coupling 62, all are mounted to the center shaft 110. The drum 4 is connected between first bearing 51 and the second bearing 52 by the rotary shaft, namely the center shaft 110; the first belt pulley 9 is connected between the third bearing 53 and the fourth bearing 54 by the rotary shaft; the first shaft coupling 61 and the second shaft coupling 62 are respectively set at either side of the torque and rotational-speed sensor 7; further, the first shaft coupling 61 is connected between the second bearing 52 and the torque and rotational-speed sensor 7 by the rotary shaft; and the second shaft coupling 62 is connected between the third bearing 54 and the torque and rotational-speed sensor 7. The driving power mechanism 31 comprises a fifth bearing 55, a sixth bearing 56 and a third shaft coupling 63, and each of those together with the electric dynamometer 14 are mounted to a third center shaft 310. Herein, the second belt pulley 10 is connected between the fifth bearing 55 and the sixth bearing 56 by the rotary shaft, namely the third center shaft 310, and the third shaft coupling 63 is connected between the electric dynamometer 14 and the fifth bearing 55 by the rotary shaft. In accordance with this embodiment, the driving power mechanism 31 and the inertia simulation mechanism 21 are coaxially mounted, and thus the center shaft 310 and the center shaft 210 is the same shaft.

Herein, the base 20 supports and fixes the road simulation mechanism 11, the inertia simulation mechanism 21 and the driving power mechanism 31. Referring to FIGS. 1-2, the base 20 supports and fixes the road simulation mechanism 11, the inertia simulation mechanism 21, and the driving power mechanism 31 via that the first to sixth shaft couplings 51-56 and the torque and rotational-speed sensor 7 are mounted on the base 20.

In accordance with embodiment, the flywheel 13 is used to for inertia simulation to simulate the inertia when the vehicle has acceleration. The electric dynamometer 14 performs the dual modes thereof; specifically in the power generation mode, the electric dynamometer 14 as an energy absorption device performs resistance simulation, uses an electric loading of dynamic loading means to simulate a total resistance applied to the electric wheel except the rolling resistance as the vehicle is driving; at the same time, a step-less adjustment to the vehicle inertia can be performed via the flywheel 13. In the motor mode, the electric dynamometer 14 can drive the whole test bed 4 including the drum 4 and the flywheel 13 to operate, and further drives the electric wheel via the drum 4 to a certain operation, then stop supplying power to the electric dynamometer 14, and thus simulation of the vehicle braking operation can be performed, and all kinds of braking simulation tests, such as the mechanical braking simulation, the electric regenerative braking simulation, and the mechanical-braking combining electric regenerative braking simulation can be performed. Additionally, since the motor of the electric wheel is limited by its rated power while actual parameters to be tested are unknown and the electric dynamometer 14 is preset and adjustable, the motor of the electric wheel cannot replace all the functions of the electric dynamometer 14 in the whole test bed, particularly during the braking simulation.

Further referring to FIG. 1, the electric wheel comprises the wheel 3, an in-wheel motor 1 and a brake disc 2, herein, the in-wheel motor 1 is mounted inside the wheel 3, the brake disc 2 is mounted to the wheel 3; a main pin arm 15 is connected with a wheel shaft (not shown) of the wheel 3 via a linear bearing (not shown). According to the structure of the electric wheel, the test bed can use the brake disc 2 of the electric wheel for mechanical braking simulation, electric regenerative braking simulation, and electric regenerative braking coupling mechanical-braking simulation test.

The portal frame 17-8 comprises two parallel columns and the cross beam together forming a door structure, and is perpendicular to the base 20. The base usually is parallel to the ground.

Figure 3:
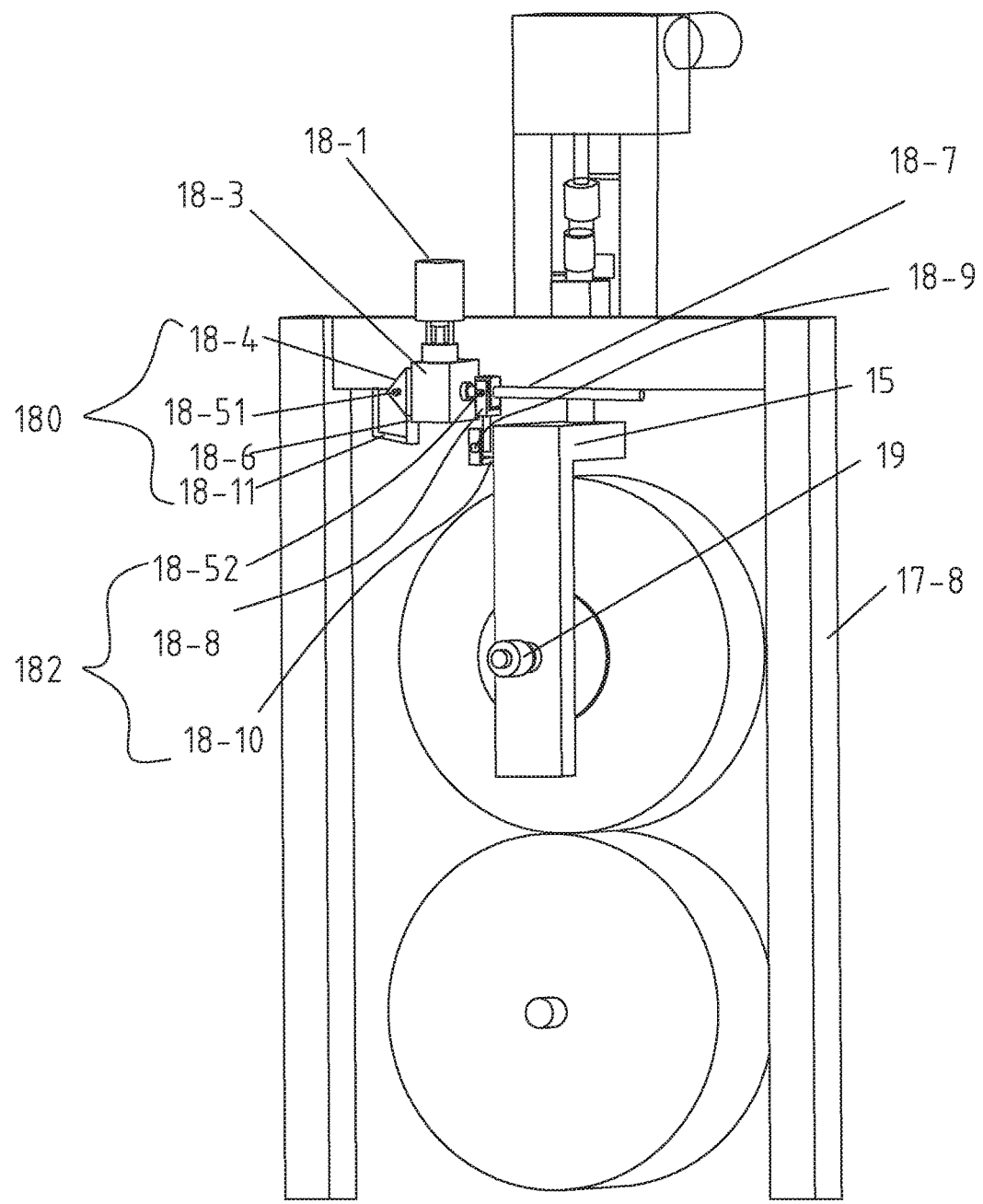
FIG. 3 is a rear perspective view of the test bed for electric wheel comprehensive performance in accordance with the embodiment of the present invention.

In a detailed embodiment, still referring to FIG. 1, the test bed comprises the main pin arm 15, and the main pin arm 15 is actively connected the portal frame 17-8. The electric wheel is detachably mounted to the main pin arm 15 in a way of center rotation. The electric wheel is mounted to the cross beam of the portal frame 17-8 via the mounting frame 15, namely the main pin arm, and is able to revolve around its own axis relative to the portal frame 17-8, and is able to turn, swing or move up and down together with the mounting frame 15. The electric wheel is disposed inside the portal frame 17-8, a radial plane of the wheel 3 perpendicular to the base 20. A main rotation shaft 16 is set at a top of the main pin arm 15, and the main pin arm 15 is mounted to the portal frame 17-8 and is capable of rotation and up-down movement via the main rotation shaft 16. As shown in FIG. 3, to simplify the design, the main pin arm 15 can be configured as a reversed-L shape, specifically, the main pin arm 15 comprises a horizontal top wall and a vertical sidewall connected with each other, wherein the vertical sidewall of the main pin arm 15 vertically extends downwards and is used for mounting the electric wheel to be tested; the main rotation shaft 16 is set at the top of the main pin arm 15 and is connected with the main pin arm 15 via a needle bearing (not shown), and the main rotation shaft 16 is vertical to the top wall of the main pin arm 15.

Further referring to FIGS. 3-5 together, the test bed comprises the steering mechanism 18, the steering mechanism 18 has a connecting seat 18-10 and the steering mechanism 18 is connected to the main pin arm 15 via an active end of the connecting seat 18-10. A steering-force sensor 18-9 for detecting the steering force is mounted to the connecting seat 18-10. A steering force is applied to the main pin arm 15 to drive the main pin arm 15 rotating around the main shaft 16, so as to drive the electric wheel mounted to the main pin arm 15 to steer.

In this embodiment, the steering mechanism 18 comprises a worm case 18-3, a first connection member 180 at one side of the worm case 18-3, the ball screw 18-7 at the other side of the worm case 18-3, a motor 18-1 above the worm case 18-3, a second connection member 182 and a steering sensor 18-9. The worm case 18-3 of the steering mechanism 18 universally connected to the portal frame 17-8, and is able to swing at a steering angle relative to the portal frame 17-8. The motor 18-1 of the steering mechanism 18 is connected with the worm case 18-3, in detail, a rotary shaft of the motor 18-1 is rotatably inserted into a connection bearing 18-2 of the worm case 18-3. One end of the second connection member 182 is universally connected to the movable end of the ball screw 18-7 of the steering mechanism 8, and the other end is fixed to the main pin arm 15 via the fixed end 18-102 of the connection seat 18-10.

Referring to FIGS. 3-5, in one detailed embodiment, the first connection member 180 comprises a connecting rod 18-11 with a fixed sleeve 18-110 at one end thereof, a fixed bearing seat 18-4, a vertical connecting shaft 18-6, and a the first pin 18-51. The fixed bearing seat 18-4 is disposed at the left side of the worm case 18-3 and opposite to the ball screw 18-7. Wherein, a first pair of shaft sleeves 18-63 is formed on a top of the vertical connecting shaft 18-6, and is vertically and rotatably fitted around first pin 18-51, the first pin 18-51 is rotatably inserted into a second pair of spaced shaft sleeves 18-43 on the fixed bearing seat 18-4 so as to further mount the connecting shaft 18-6 between the two spaced shaft sleeves 18-43. A lower end 18-60 of the vertical connecting shaft 18-6 is a straight rod, and is rotatably inserted and supported in the fixed sleeve 18-110 at the free end of the connecting rod 18-11. The other end 18-112 of the connecting rod 18-11 (also as the fixed end of the steering mechanism 18) is soldered to the portal frame 17-8. It is understood, the rotatable engagement between the lower end 18-60 of the vertical connecting shaft 18-6 and the fixed sleeve 18-110 at the free end of the connecting rod 18-11 can be designed that the lower end 18-60 is a sleeve, thus the fixed sleeve 18-110 is inserted into the lower end 18-60 of the connecting shaft 18-6, both the fixed sleeve 18-110 and the lower end 18-60 are horizontally and rotatably engaged.

The whole steering mechanism 18 can rotate horizontally or vertically relative to the portal frame 17-8. Specifically, the steering mechanism 18 can rotate horizontally in such way that the vertical connecting shaft 18-6 rotates in the fixed sleeve 18-110, and can rotate vertically via a rotation of the first pin 18-51 relative to the fixed bearing seat 18-4.

The second connection member 182 comprises a rolling bearing 18-8, a second pin 18-25 and the connection seat 18-10. Herein, the second pin 18-52 are rotatably engaged with the ball screw 18-7, the rolling bearing 18-8 is hinged to the movable end of the ball screw 18-7 of the steering mechanism 18 via the second pin 18-52 so that the rolling bearing 18-8 can move along the ball screw 18-7 left and right linearly. The steering-force sensor 18-9 is soldered in the connection seat 18-10 for detecting the steering force; the connection seat 18-10 has a fixed sleeve 18-100 thereon. A vertical shaft extends downwards from the rolling bearing 18-8, and a lower end of the vertical shaft 18-80 is rotatably fitted in the fixed sleeve 18-100 of the connection seat 18-10; at the same time, the vertical shaft 18-80 horizontally moves left and right with the rolling bearing 18-8. The rotation of the lower end of the vertical shaft 18-80 relative to the fixed sleeve 18-100 can balance the horizontal and vertical swings of the rolling bearing 18-8 with the whole steering mechanism 18 under the drive of the ball screw 18-7.

The connection seat 18-10 has one end thereof vertically set with the fixed sleeve 18-100 aligned to the vertical shaft 18-80, has the other end namely the fixed end 18-102 fixed to the main pin arm 15, the steering-force sensor 18-9 is soldered in the middle section of the connection seat 18-10 for detecting the steering force applied to the fixed sleeve 18-100 by the vertical shaft 18-80. In this embodiment, the connection seat 18-10 also is in an "L" shape.

The vertical connecting shaft 18-6 and the rolling bearing 18-8 can be fork bearing; the fixed bearing seat 18-4, the vertical connecting shaft 18-6, and the first pin 18-51 of the first connection member 180 together form an universal holder; and the rolling bearing 18-8, the movable end of the ball screw 18-7 and the second pin 18-52 of the second connection member 182 together forms an universal holder too. The connecting rod 18-11 has an "L" shape in accordance with this embodiment, one end of the connecting rod 18-11 is set with the vertical fixed sleeve 18-110 to rotatably engage with the end of the vertical connecting shaft 18-6, the other end (as the fixed end of the steering mechanism 18) can be configured as a square steel tube and is soldered to the portal frame 17-8.

During steering, the motor 18-1 of the steering mechanism 18 drive its rotary shaft to revolve clockwise or counterclockwise, so as to drive the worm (not shown) in the worm case 18-3 to revolve clockwise or counterclockwise, further drive the worm gear (not shown) of the worm case 18-3 to revolve, and then drive the moveable end of the ball screw 18-7 to move left and right or forwards or backwards along the length of the ball screw; the vertical shaft 18-80 in the shaft sleeve 18-100 can push the shaft sleeve 18-100 towards the right so as to push the connection seat 18-10, thus push the main pin arm 15 via the connection seat 18-10, and then a tangential force relative to a rotation direction of the main rotation shaft 16 is applied to the main pin arm 15, so as to drive the frame 15, namely the main pin arm, to rotate around the main rotation shaft 16 via the fixed end 18-102. Here, the main pin arm 15 drives the electric wheel to rotate around the main rotation shaft 16. On the other hand, the rolling bearing 18-8 rotates with the main pin arm 15, and further drives the vertical connecting shaft 18-6 to rotate in the fixed sleeve 18-110 of the connecting rod 18-11, which performs steering simulation. Further, the steering-force sensor 18-9 can detect the steering force in real time, which monitored the steering force during steering simulation. The road test to the steered electric wheel, can verify whether points or inner elements of the electric wheel can stably operates a long time, and can supply a substantial base and condition to the related sideslip preventive test, which makes the whole test of the electric wheel closer to actual driving conditions.

Additionally, the steering mechanism 18 in accordance with this embodiment, drives the worm case 18-3 via the motor 18-1, further drives the ball screw 18-7 and thus applies the steering force to the electric wheel via the main pin arm 15; which operates simply and stably, and a lateral force generated in the steering road test to balance the friction force can be detected by the lateral-force sensor 19 in real time. In accordance with this embodiment, the ball screw 18-7 can move left and right along its length, while in the whole steering mechanism 18, can horizontally and vertically swing together with the steering mechanism, so that the main pin arm 15 is driven to rotate around the main rotation shaft 16 via the rolling bearing 18-8 and the connection seat 18-10 to perform the steering function.

Figure 6:
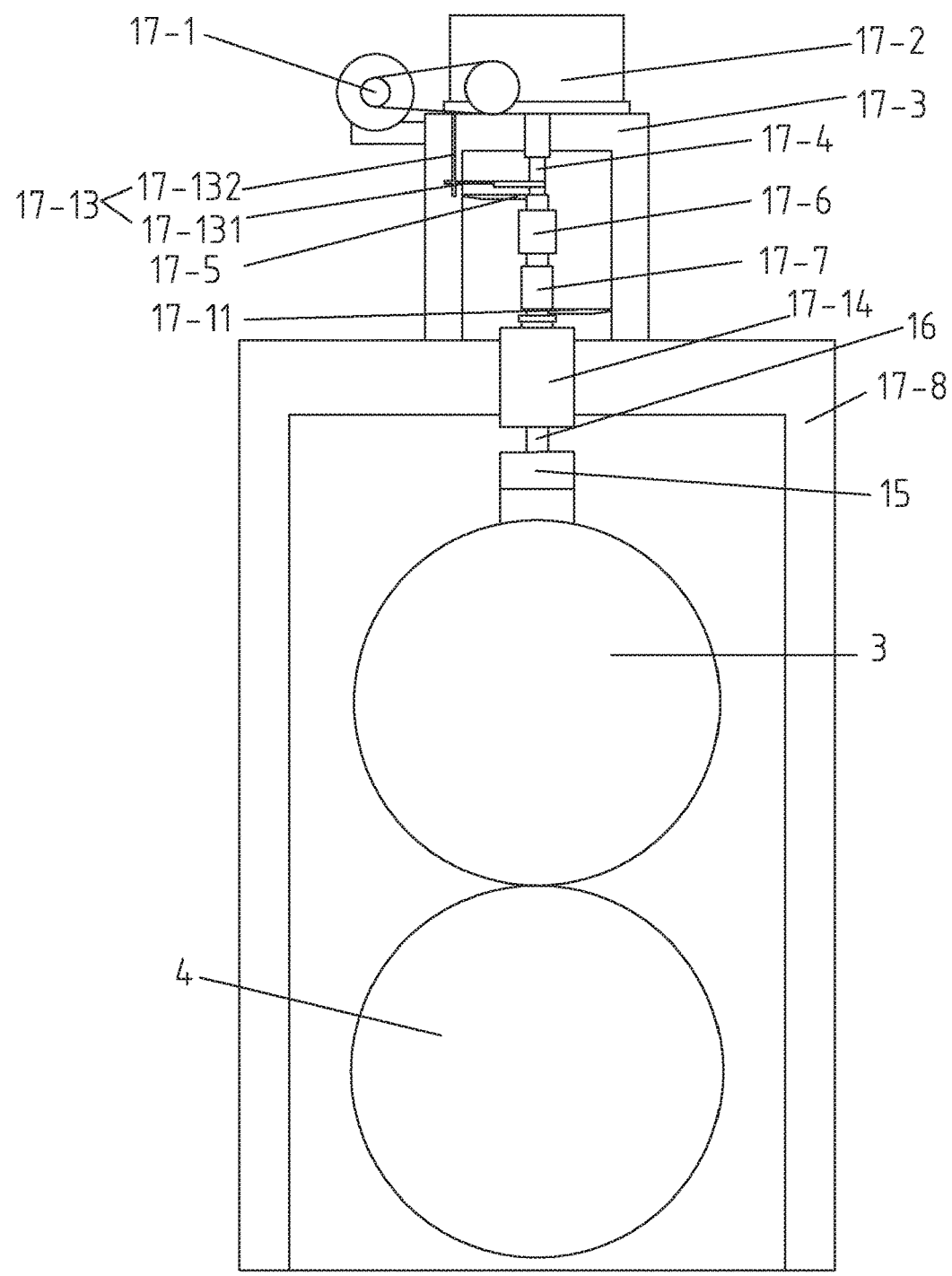
FIG. 6 is a front plan view of the test bed for electric wheel comprehensive performance in accordance with the embodiment of the present invention.
Figure 7:
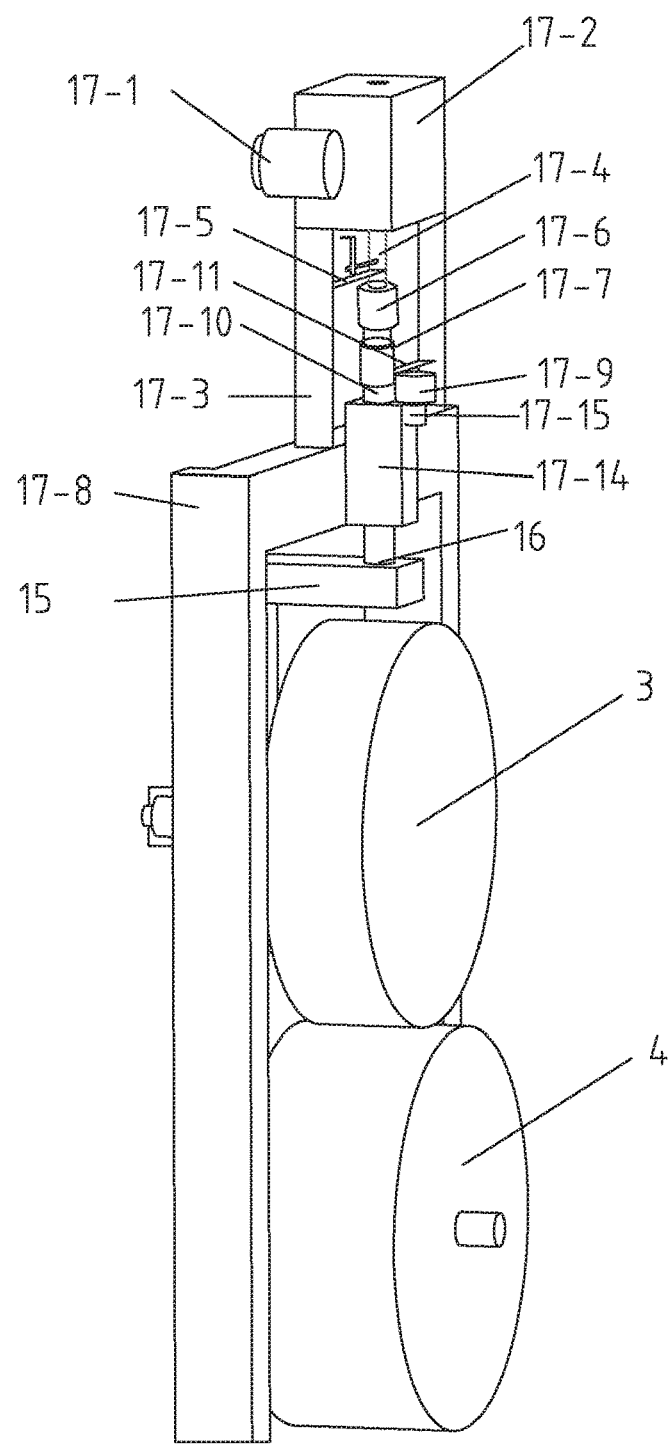
FIG. 7 is a side plan view of the test bed for electric wheel comprehensive performance in accordance with the embodiment of the present invention.

In another embodiment, referring to FIGS. 6-7, the test bed further comprises a perpendicular loading mechanism 17. The perpendicular loading mechanism 17 is connected with the main pin arm 15 via the main rotation shaft 16, further to transfer the load to the electric wheel via the main rotation shaft 16 and the main pin arm 15. In detail, along a top-down and vertical direction, the perpendicular loading mechanism 17 comprises a motor 17-1, a worm case 17-2 with a ball screw 17-4, a bidirectional-pressure connector 17-6, a pull-pressure sensor 17-7 and a bearing 17-14; a support 17-3 is set on a top of the cross beam of the portal frame 17-8; the worm case 17-2 of the perpendicular loading mechanism 17 is fixed on a top of the support 17-3; the motor 17-1 of the perpendicular loading mechanism 17 is set on the support 17-3 and is connected with the worm case 17-2 of the perpendicular loading mechanism 17; the movable end of the ball screw 17-4 of the perpendicular loading mechanism 17 is fitted into one end of the bidirectional-pressure connector 17-6, and the other end of the bidirectional-pressure connector 17-6 is connected with the pull-pressure sensor 17-7; the main rotation shaft 16 have one end thereof inserted through the bearing 17-14 and then connected with the pull-pressure sensor 17-7; the other end of the main rotation shaft 16 are connected with the main pin arm 15 via a needle bearing.

During the vertical load applied, the motor 17-1 starts (a positive or negative rotation), and drives a worm (not shown) of the worm case 17-2 to positively or negatively rotate, and then drives a worm gear of the worm case 17-2 to rotate, and further drives the ball screw 17-4 to move upwards or downwards; via the bidirectional-pressure connector 17-6 and the pull-pressure sensor 17-7 to the main rotation shaft 16, and then via the main pin arm 15, the vertical load is applied to the electric wheel. Therein, when the ball screw 17-4 moves upwards, the vertical load becomes reduced; while the ball screw 17-4 moves downwards, the vertical load becomes increased. Using the perpendicular loading mechanism 17 to apply a vertical load with motor loading, the test bed can simulate the electric wheel jumping up or down during the vehicle travels along a route; and the test can check whether inner elements of the motor of the electric wheel can work stably for a long period under a vibration impact, and can corporate the braking system for ABS test, composite braking test or the like, so as to simulate the vertical load such as the weight itself and the load to the vehicle in actual driving conditions. Additionally, the perpendicular loading mechanism 17 in accordance with this embodiment drives the worm case 17-2 via the motor 17-1, then drives the ball screw 17-4 so as to apply the vertical load to the electric wheel, in such way that the control becomes simple and stable, the test result of the vertical-load simulation is accurate, it is benefit for the research to the electric vehicle; furthermore, the pull-pressure sensor 17-7 can obtain the real-time value of the vertical load, thus according to the value of the vertical load, the vertical load applied to the electric wheel can be dynamically adjusted so as to keep closer to the practical movement of the vehicle.

Combing the above universal-connection frame structures of both the first connection member 180 and the second connection member 182 of the steering mechanism 18, when the perpendicular loading mechanism 17 applies the vertical load, the main pin arm 15 will move along the vertical direction with increasement or decreasement of the load, thus the rolling bearing 18-8 fixed to the main pin arm 15 will rotate to further drive the vertical connecting shaft 18-6 rotating around the first pin 18-51, thereby, the vertical load via the perpendicular loading mechanism 17 will not affect the steering of the steering mechanism 18.

Preferably, the perpendicular loading mechanism 17 comprises a stopping fork 17-13; the stopping fork 17-13 comprises a horizontal rod 17-131 and a vertical rod 17-132 crossed each other; the horizontal rod 17-131 is fixed to the ball screw 17-4 of the perpendicular loading mechanism 17, while the vertical rod 17-132 is fixed to the cross beam of the portal frame 17-8; therein, the vertical rod 17-132 controls the horizontal rod 17-131 only moving along a length direction of the vertical rod 17-132; thereby the ball screw 17-4 of the perpendicular loading mechanism 17 just can move up and down but not rotate, so that a movable end of the ball screw 17-4 of the perpendicular loading mechanism 17 just can move up and down, thus the vertical load applied to the electric wheel can be better simulated, and the accuracy of the simulation result of the vertical load (including the vehicle weight) can be improved.

Preferably, the perpendicular loading mechanism 17 comprises a longer gear 17-9 and a shorter gear 17-10; the cross beam of the portal frame 17-8 is further set with a bearing 17-15; a center shaft of the longer gear 17-9 is fitted in bearing 17-15 and can be horizontally rotate; therein, the shorter gear 17-10 is located above the bearing 17-14; a center shaft of the shorter gear 17-10 has one end thereof connected with the pull-pressure sensor 17-7, and the other end thereof rotatably connected with the main rotation shaft 16; furthermore, the longer gear 17-9 is engaged with the shorter gear 17-10; the longer gear 17-9 on its surface is fixedly set with an angle sensor 17-11; and the angle sensor is used for detecting the steering angle of the electric wheel during the electric wheel is steered. Moreover, via the longer gear 17-9, the angle sensor set on the surface of the longer gear 17-9, the steering angle of the electric wheel can be detected while the vertical load applied to the electric wheel via the perpendicular loading mechanism 17 will not be affected.

Further, during the actual driving conditions, the steering angle of the electric wheel is not unlimited; for simulating the actual driving conditions, the longer gear 17-9 on its surface is further set with an angle-limiting stopper 17-12; and for coupling with the angle-limiting stopper 17-12, for example, the beam of the portal frame 17-8 horizontally forms a sliding groove (not shown), and the sliding groove can be configured as an arc-shape, the radian of the arc can be configured according to the actually rotatable angle of the electric wheel when the electric vehicle is steered; the steering force applied by the steering mechanism 18 is finally transferred to the electric wheel attached to the main pin arm 15 via a few elements, even if the steering force is big enough, the electric wheel is still just able to rotate at a preset angle range under the limitation of the angle-limiting stopper 17-12, which is closer to the actual driving conditions.

Preferably, the perpendicular loading mechanism 17 comprises an up and down limiter 17-5; the up and down limiter 17-5 is fixedly set to the movable end of the ball screw 17-4 of the perpendicular loading mechanism 17; certainly, for coupling with the up and down limiter 17-5 to limit the motion of the ball screw 17-4, the beam of the portal frame 17-8 usually forms a sliding groove (not shown), and the sliding groove is set along a length direction of the column of the portal frame 17-8; furthermore, both top and bottom ends of the sliding groove each has a contact (not shown); when the up and down limiter 17-5 contacts the contact, the ball screw 17-4 will stop moving to the same contact at once.

In accordance with above embodiments, preferably, the main rotation shaft 16 is mounted on top of the main pin arm 15, and when the electric wheel is mounted to the main pin arm 15, the main rotation shaft 16 is just located above the electric wheel, such that the main rotation shaft 16 keeps not shifted; thereby, the electric wheel always keeps contacted with a peak of the drum 4, namely, even linear motion or rotation, the electric wheel still keeps contacted with a peak of the drum 4; in such way to avoid a shift of the main rotation shaft 16 not being zero that the steering angle would be too wide to bring the wheel away from the peak of the drum and thus bring an inaccuracy.

Above are just embodiments of the present invention, not limit the scope of the present invention, similar structures or modifications based on the description and drawings, or which are directly or indirectly applied to other field, are all comprised in the scope and spirit of the invention.

INDUSTRIAL APPLICABILITY

The test bed for electric wheel comprehensive performance provided in the present invention, is used for simulation and test of vehicle performance in the industry, solves technical problems of vehicles in the industry, and thus has industrial applicability.

What is claimed is:

1. A test bed for electric wheel comprehensive performance, comprising:
   a base;
   a portal frame, set on the base, comprising a cross beam and two columns each supported at either ends of the cross beam;
   a main pin arm, actively connected to the portal frame; and
   a main rotation shaft, rotatably and vertically mounted on a top of the main pin arm;
   wherein an electric wheel is mounted to the main pin arm inside the portal frame and just below the main rotation shaft; the test bed further comprises at least one of mechanisms selected from a road simulation mechanism, an inertia simulation mechanism, a driving power mechanism, a perpendicular loading mechanism, and a steering mechanism, all of which are used for performing simulation test to the electric wheel;
   the road simulation mechanism comprises: a drum, a torque and rotational-speed sensor, and several bearings and shaft couplings; the drum is just located below the electric wheel, both the drum and the electric wheel have their circumferential surfaces with a tangent contact each other; the electric wheel always keeps tangent contact with the drum; the drum and the torque and rotational-speed sensor are connected via the bearings and the shaft couplings for driving-force transmission; the road simulation mechanism is mounted on the base via the bearings;
   the inertia simulation mechanism comprises a flywheel and a clutch coaxially connected with each other; the inertia simulation mechanism and the road simulation mechanism are connected via driving-force transmission;
   the driving power mechanism is selectably in a motor mode or in a power generation mode, comprises an electric dynamometer: in the motor mode for braking simulation, further comprises a power source for supplying power to the electric dynamometer; in the power generation mode of the driving power mechanism, further comprises an energy dissipation device for consuming energy generated by the electric dynamometer; the electric dynamometer are connected with both the inertia simulation mechanism and the road simulation mechanism via driving-force transmission;
   the road simulation mechanism and the inertia simulation mechanism are connected via belt pulleys for driving-force transmission; the driving power mechanism is connected with the inertia simulation mechanism with bearings and shaft couplings coaxially and rotatably connected therebetween; and the bearings connecting the driving power mechanism and the inertia simulation mechanism are mounted on the base.

2. The test bed for electric wheel comprehensive performance as claimed in claim 1, wherein the steering mechanism is mounted to both the portal frame and the main pin arm in a way rotating horizontally or vertically relative to the portal frame; the steering mechanism comprises a motor, a worm case, a ball screw, a steering-force sensor, a first connection member and a second connection member; a rotary shaft of the motor is rotatably engaged with the worm case and drives a worm in the worm case to rotate; the ball screw and the worm case are engaged with each other to transfer rotation to linear motion; the first connection member connects the worm case to the portal frame in a way of universal activity; the second connection member connects both the worm case and the ball screw to the main pin arm in a way of universal activity and drives the main pin arm to rotate around the main rotation shaft to steer the electric wheel; the steering-force sensor is used to detect a steering force of the main pin arm.

3. The test bed for electric wheel comprehensive performance as claimed in claim 2, wherein the first connection member at one side thereof comprises a connecting rod with a fixed sleeve at one end thereof, a fixed bearing seat, a vertical connecting shaft and a first pin; the fixed bearing seat and the ball screw are respectively set at a left and right side of the worm case; a top end of the vertical connecting shaft is rotatably fitted around the first pin; the first pin is rotatably mounted to the fixed bearing seat; a lower end of the vertical connecting shaft is supported via the fixed sleeve of the connecting rod with an engagement of horizontal rotation therebetween; the other end of the connecting rod is fixedly connected to the portal frame; the steering mechanism is able to rotate horizontally via a rotatable engagement between the lower end of the vertical connecting shaft and the fixed sleeve, and is able to rotate vertically via rotatable engagements between the first pin and both the fixed bearing seat and the top end of the vertical connecting shaft.

4. The test bed for electric wheel comprehensive performance as claimed in claim 3, wherein the vertical connecting shaft is in a shape of a fork.

5. The test bed for electric wheel comprehensive performance as claimed in claim 3, wherein the top end of the vertical connecting shaft is fitted around the first pin via a pair of shaft sleeves set on the vertical connecting shaft and vertically rotates; the first pin is rotatably inserted into a pair of spaced shaft sleeves set on the fixed bearing seat, and further mounts the connecting shaft between the pair of spaced shaft sleeves.

6. The test bed for electric wheel comprehensive performance as claimed in claim 5, wherein the lower end of the vertical connecting shaft is straight-rod like and is rotatably fitted in the fixed sleeve at one end of the connecting rod; the connecting rod is shaped as an "L" with one end thereof set with the fixed sleeve for a rotatable engagement with the lower end of the vertical connecting shaft and with the other end is fixed to the portal frame.

7. The test bed for electric wheel comprehensive performance as claimed in claim 2, wherein the second connection member comprises a rolling bearing, a second pin and a connection seat; the rolling bearing is hinged with a movable end of the ball screw via the second pin; a steering-force sensor is mounted in the connection seat; the connection seat at one end thereof is set with a fixed sleeve, and the other end of the connection seat is fixed to the main pin arm; the rolling bearing is set with a vertical shaft extending downwards and is rotatably inserted in the fixed sleeve of the connection seat whereby the steering force is transferred to both the steering-force sensor and the main pin arm.

8. The test bed for electric wheel comprehensive performance as claimed in claim 7, wherein the rolling bearing is shaped as a fork.

9. The test bed for electric wheel comprehensive performance as claimed in claim 7, wherein the ball screw is horizontally set above the main pin arm; the rolling bearing is mounted to the movable end of the ball screw at a left side thereof, and the second pin is rotatably fitted through the rolling bearing and is perpendicular to the ball screw.

10. The test bed for electric wheel comprehensive performance as claimed in claim 1, wherein a rotary shaft of the main pin arm for mounting the electric wheel is set with a lateral-force sensor for detecting a value of a lateral force.

11. The test bed for electric wheel comprehensive performance as claimed in claim 1, wherein the perpendicular loading mechanism is connected to the main pin arm via the main rotation shaft, and transfers a vertical load through the main rotation shaft and the main pin arm to the electric wheel, the electric wheel moves up and down following the main pin arm, which is able to simulate the electric wheel jumping up and down under actual driving conditions.

12. The test bed for electric wheel comprehensive performance as claimed in claim 11, wherein the perpendicular loading mechanism comprises the motor, the worm case with the ball screw, a bidirectional-pressure connector, a pull-pressure sensor and a shorter gear; a support is set above the cross beam of the portal frame, the worm case of the perpendicular loading mechanism is fixedly set to the support, the motor of the perpendicular loading mechanism is set to the support and is connected with the worm case of the perpendicular loading mechanism, the movable end of the ball screw of the perpendicular loading mechanism is fitted in one end of the bidirectional-pressure connector, the other end of the bidirectional-pressure connector is connected with the pull-pressure sensor, the pull-pressure sensor is connected with the shorter gear, a rotary shaft of the shorter gear is connected to the main rotation shaft, and the main rotation shaft is connected to the main pin arm via the bearing.

* * * * *